US012791090B2

(12) United States Patent
Ryu et al.

(10) Patent No.: US 12,791,090 B2
(45) Date of Patent: Nov. 10, 2026

(54) DIFFERENTIAL APPARATUS FOR ELECTRIC VEHICLES

(71) Applicants: Hyundai Motor Company, Seoul (KR); Kia Corporation, Seoul (KR)

(72) Inventors: Youngbae Ryu, Hwaseong-si (KR); Jin Seung Lim, Hwaseong-si (KR); Jaeweon Jun, Hwaseong-si (KR); Sang Bum Baek, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 19/323,299

(22) Filed: Sep. 9, 2025

(65) Prior Publication Data

US 2026/0071672 A1 Mar. 12, 2026

(30) Foreign Application Priority Data

Sep. 10, 2024 (KR) ........................ 10-2024-0122963

(51) Int. Cl.
*F16H 48/08* (2006.01)
*F16H 48/38* (2012.01)

(52) U.S. Cl.
CPC ....... *F16H 48/38* (2013.01); *F16H 2048/387* (2013.01)

(58) Field of Classification Search
CPC .......... F16H 48/00; F16H 48/06; F16H 48/08; F16H 48/12; F16H 48/14; F16H 48/142;
(Continued)

(56) References Cited

U.S. PATENT DOCUMENTS

2006/0234824 A1* 10/2006 Rastel .................. F16H 57/037 475/247
2012/0244986 A1* 9/2012 Masui ..................... F16H 48/08 475/220

(Continued)

FOREIGN PATENT DOCUMENTS

CN 103261748 A * 8/2013 ............. F16H 48/08
CN 107939938 A * 4/2018 ............. F16H 48/06

(Continued)

OTHER PUBLICATIONS

Description Translation for DE 10319854 from Espacenet (Year: 2004).*

(Continued)

*Primary Examiner* — Daniel M. Keck
(74) *Attorney, Agent, or Firm* — MORGAN, LEWIS & BOCKIUS LLP

(57) ABSTRACT

A differential apparatus for an electric vehicle includes a differential case disposed between driveshafts, a pinion shaft disposed in the differential, at least two pinion gears rotatably coupled on each side of the pinion shaft, and a pair of side gears disposed in a direction perpendicular to the pinion gears, the differential apparatus includes a pinion shaft supporter disposed on the pinion shaft between the pinion gears within the differential case, support plates on first and second sides thereof which are friction-supported by contacting respective internal surfaces of the pair of side gears and facing respective lateral sides of the pinion shaft supporter, and elastic members respectively disposed between first and second lateral sides of the pinion shaft supporter and the respective internal sides of the support plates to provide an elastic force in the axial direction to the pair of side gears.

9 Claims, 5 Drawing Sheets

(58) Field of Classification Search

CPC ........ F16H 48/145; F16H 48/19; F16H 48/20; F16H 48/28; F16H 48/285; F16H 48/29; F16H 48/38; F16H 2048/082; F16H 2048/085; F16H 2048/087; F16H 2048/282; F16H 2048/387; F16H 57/02; F16H 57/021; F16H 57/022; F16H 57/037; F16H 57/12; F16H 2057/02039; F16H 2057/02043; F16H 2057/0221; F16H 2057/0225; F16H 2057/126; F16H 2057/127

USPC ....... 180/337, 374, 375, 376, 377, 378, 379, 180/382

See application file for complete search history.

(56) References Cited

U.S. PATENT DOCUMENTS

| | | | | |
|---|---|---|---|---|
| 2016/0334005 | A1* | 11/2016 | Adragna | F16H 57/0424 |
| 2016/0341296 | A1* | 11/2016 | Shoji | F16H 48/06 |
| 2017/0292596 | A1* | 10/2017 | Kamitani | F16H 48/34 |
| 2018/0038475 | A1* | 2/2018 | Nadayoshi | F16H 48/08 |
| 2018/0156323 | A1* | 6/2018 | Adragna | B60K 17/34 |
| 2018/0208057 | A1* | 7/2018 | Yoshimura | B60K 17/3505 |
| 2018/0245677 | A1* | 8/2018 | Yoshisaka | F16H 48/06 |
| 2019/0113082 | A1* | 4/2019 | Fukuda | F16H 48/12 |
| 2019/0219143 | A1* | 7/2019 | Hirota | F16H 48/14 |
| 2019/0271386 | A1* | 9/2019 | Suzuki | F16H 48/08 |
| 2021/0356033 | A1* | 11/2021 | Oda | F16H 48/08 |

FOREIGN PATENT DOCUMENTS

| | | | | | |
|---|---|---|---|---|---|
| CN | 120969440 | A | * | 11/2025 | F16H 55/20 |
| CN | 121322602 | A | * | 1/2026 | F16H 57/12 |
| DE | 1257594 | B | * | 12/1967 | F16H 48/24 |
| DE | 1680700 | A1 | * | 4/1971 | F16H 48/08 |
| DE | 10209166 | A1 | * | 9/2003 | F16H 48/08 |
| DE | 10319854 | A1 | * | 11/2004 | F16H 48/08 |
| DE | 102021117846 | A1 | * | 1/2022 | F16H 48/08 |
| EP | 2886909 | A1 | * | 6/2015 | F16H 48/28 |
| EP | 4246015 | A1 | * | 9/2023 | F16H 48/40 |
| JP | 2012102772 | A | * | 5/2012 | F16H 48/08 |
| JP | 2012207739 | A | * | 10/2012 | |
| JP | 2013104516 | A | * | 5/2013 | |
| JP | 2013185655 | A | * | 9/2013 | |
| JP | 2017180814 | A | * | 10/2017 | |
| JP | 2017194156 | A | * | 10/2017 | |
| JP | 2017219157 | A | * | 12/2017 | |
| JP | 2018062950 | A | * | 4/2018 | |
| JP | 2018100705 | A | * | 6/2018 | |
| JP | 2018168891 | A | * | 11/2018 | |
| JP | 2019086055 | A | * | 6/2019 | F16H 48/38 |
| JP | 2019086084 | A | * | 6/2019 | |
| JP | 6562050 | B2 | * | 8/2019 | F16H 57/0423 |
| JP | 2019143646 | A | * | 8/2019 | |
| JP | 2019143652 | A | * | 8/2019 | |
| JP | 2020034034 | A | * | 3/2020 | |
| JP | 2020076460 | A | * | 5/2020 | |
| KR | 10-1416165 | B | | 7/2014 | |
| KR | 20-2021-000920 | U | | 4/2021 | |
| KR | 20230152541 | A | * | 11/2023 | F16H 48/40 |
| KR | 20250020268 | A | * | 2/2025 | F16H 57/021 |
| KR | 20250114653 | A | * | 7/2025 | B60K 17/16 |
| WO | WO-2004036088 | A1 | * | 4/2004 | F16H 48/08 |

OTHER PUBLICATIONS

Description Translation for DE 1257594 from Espacenet (Year: 1967).*

* cited by examiner

DIFFERENTIAL APPARATUS FOR ELECTRIC VEHICLES

CROSS-REFERENCE TO RELATED APPLICATION

The present application claims priority to and the benefit of Korean Patent Application No. 10-2024-0122963 filed with the Korean Intellectual Property Office on Sep. 10, 2024, the entire contents of which are incorporated herein by reference.

BACKGROUND OF THE INVENTION

Field of the Present Disclosure

The present disclosure relates to a differential apparatus, and more particularly, the present disclosure relates to a differential apparatus for an electric vehicle for improving the generation of differential noise.

Description of the Related Art

In general, a differential apparatus (i.e., called a differential) for a vehicle is a power delivery device configured between the left and right drive shafts connected to the left and right driving wheels, respectively. When the vehicle is driving, when the vehicle turns or the road surface is uneven, and a difference in rotation speed occurs between the left and right driving wheels, it absorbs the difference in rotation speed between the left and right driving wheels to enable smooth driving.

FIG. 5 is a cross-sectional view of a typical vehicle differential apparatus.

Referring to FIG. 5, the differential apparatus, i.e., the differential DF, includes a pair of pinion gears PG and a pair of side gears SG inside a differential case DFC.

The differential case DFC is placed between left and right driveshafts, and a differential ring gear is fixedly installed on outside to externally engage with a transfer gear of a transmission, etc., to input torque.

Furthermore, the differential case DFC has a pinion shaft PS installed inside in a direction perpendicular to the left and right driveshafts, and a rotatably pair of pinion gear PG is installed on the upper and lower sides of the pinion shaft PS, respectively.

The pair of pinion gears PG is externally engaged with the pair of side gears SG arranged in a right-angled direction, and the pair of side gears SG are fixed to the left and right driveshafts, respectively.

When torque is input from a transmission, etc. Through the differential ring gear, the differential case DFC rotates to transmit the torque to the left and right driveshafts.

That is, when the vehicle is driving straight, the load applied to the left and right driving wheels is the same, so that the same load is applied to the pair of pinion gear PG through the pair of side gear SG. Accordingly, the pair of pinion gear PG rotates with the differential case DFC and rotates the pair of side gear SG at the same rotation speed, transmitting the driving torque to the left and right driving wheels.

On the other hand, when the vehicle turns, the load transmitted through the pair of side gears SG differs due to the difference in rotation speed of the left and right driving wheels. Accordingly, the pair of pinion gears PG rotates in a direction that absorbs the difference in rotation speed and revolves simultaneously to transmit driving torque to the left and right driving wheels.

When such differential apparatus is applied to an auxiliary drive wheel for the enhancement of fuel efficiency of a 4 WD electric vehicle, a disconnector system (DAS: Disconnect Actuator System) is applied together with the differential DF or driveshaft. At the instant time, when the electric vehicle is driven in 2 WD, the auxiliary drive wheel and a motor reduction gear are separated to reduce the drag torque, improving the fuel efficiency.

The differential apparatus applied to the auxiliary drive wheel of a 4 WD electric vehicle is assembled by selectively applying a spacer 100 according to thickness between the differential case DFC and the exterior surface of the pair of side gears SG to secure appropriate backlash of the differential gear consisting of the side gear SG and pinion gear PG, considering vibration, noise, durability, etc. However, there is no function to maintain the initial predetermined backlash or to prevent the side gear SG from being pushed inward by an axial force transmitted from the outside thereof.

However, in real vehicle driving conditions, the backlash increases and decreases due to the axial force in the direction of the differential gear according to the torque of the differential gear, and the backlash of the differential gear also increases and decreases due to various causes such as the angle of the driveshaft, the material of the boot, the position of the boot clamp, and temperature.

, unlike conventional internal combustion engine vehicles, in an electric vehicle, when driving in 2 WD, if the disconnector system on the auxiliary drive wheel side is released, a differential occurs due to the high-speed rotation of the differential gear. At the instant time, if the side gear SG is pushed inward by the axial force of the driveshaft, etc., and the backlash inside the differential gear is insufficient, noise is generated as the side gear SG and pinion gear PG come into hard contact.

However, the differential gear of the existing mass-produced differential DF does not include a structure for maintaining a separate backlash, and it is impossible to prevent noise generated when the backlash of the differential gear is reduced by the axial force of the driveshaft, and it is also difficult to maintain a predetermined backlash during the initial assembly.

The information contained in this Background section has been provided to promote understanding of the background of the invention and may include matters that are not related art and are already known to those skilled in the art.

SUMMARY OF THE INVENTION

The present disclosure attempts to provide a differential apparatus for an electric vehicle that improves the generation of differential noise by maintaining the initial backlash of a differential gear.

A differential apparatus for an electric vehicle including a differential case disposed between left and right driveshafts, a pinion shaft disposed in the differential case in a direction perpendicular to the left and right driveshafts inside the differential case, at least two pinion gears rotatably coupled on each side of the pinion shaft, and a pair of side gears disposed in a direction perpendicular to the pinion gears and fixed on end portions of the left and right driveshafts respectively to externally engage the pinion gears, the differential apparatus according to various disclosure may include a pinion shaft supporter disposed on the pinion shaft between the pinion gears within the differential case, support plates on first and second sides thereof which are friction-supported by contacting respective internal surfaces of the pair of side gears and facing respective lateral sides of the pinion shaft supporter, and elastic members respectively disposed between first and second lateral sides of the pinion shaft supporter and the respective internal sides of the support plates to provide an elastic force in the axial direction to the pair of side gears.

The pinion shaft supporter may include a penetration hole formed in the axial direction to penetrate first and second lateral sides facing the pair of side gears, two insertion holes formed opposite to each other on a circumference surface of the pinion shaft supporter, into which a center portion of the pinion shaft is inserted, and a contacting surface formed on the first and second lateral sides of the penetration hole circumference where the elastic member comes into contact.

The support plate may be formed with the same external shape as both lateral sides of the pinion shaft supporter and may be made of a plate of wear-resistant material with a central hole formed in a center portion of the support plate identical to the penetration hole.

The support plate may be formed with a support means which is supported by the penetration hole internal circumference of the pinion shaft supporter and fixed in a rotation direction with respect to the pinion shaft supporter.

The support means may include a plurality of support grooves formed along the axial direction in the penetration hole internal circumference of the pinion shaft supporter, and a plurality of support end portions elongated in the axial direction from an internal diameter of the central hole of the support plate and supported by being fitted into the support grooves.

The support grooves and the support end portions may be formed at predetermined intervals along the penetration hole internal circumference of the pinion shaft supporter and the internal diameter of the central hole of the support plate.

The support groove may be formed as a groove along the axial direction in the penetration hole internal circumference of the pinion shaft supporter, and the support end portion may be formed as a flange extending along the axial direction from the internal diameter of the central hole of the support plate.

The elastic member may include a wave a washer.

According to various disclosure of the differential apparatus for an electric vehicle, the elastic member including the support plate and the wave washer is disposed between the pinion shaft supporter inside the differential case and the side gears on both sides to support the side gears on both sides from being pushed inward due to assemble tolerance of the driveshaft, angle of the driveshaft, driving torque, or axial load axial force generated by axial direction pressure of a boot, maintaining the initial backlash of the differential gear and preventing differential noise from occurring.

Furthermore, the effects which may be obtained or expected due to the exemplary embodiments of the present disclosure are directly or implicitly disclosed in the detailed description of the exemplary embodiments of the present disclosure. That is, various effects anticipated according to various exemplary embodiments of the present disclosure will be disclosed in the detailed description that follows.

BRIEF DESCRIPTION OF THE DRAWINGS

Since these drawings are for reference in describing various disclosure of the present disclosure, the technical ideas of the present disclosure should not be interpreted as limited to the appended drawings.

Description of Symbols

Figure 1:
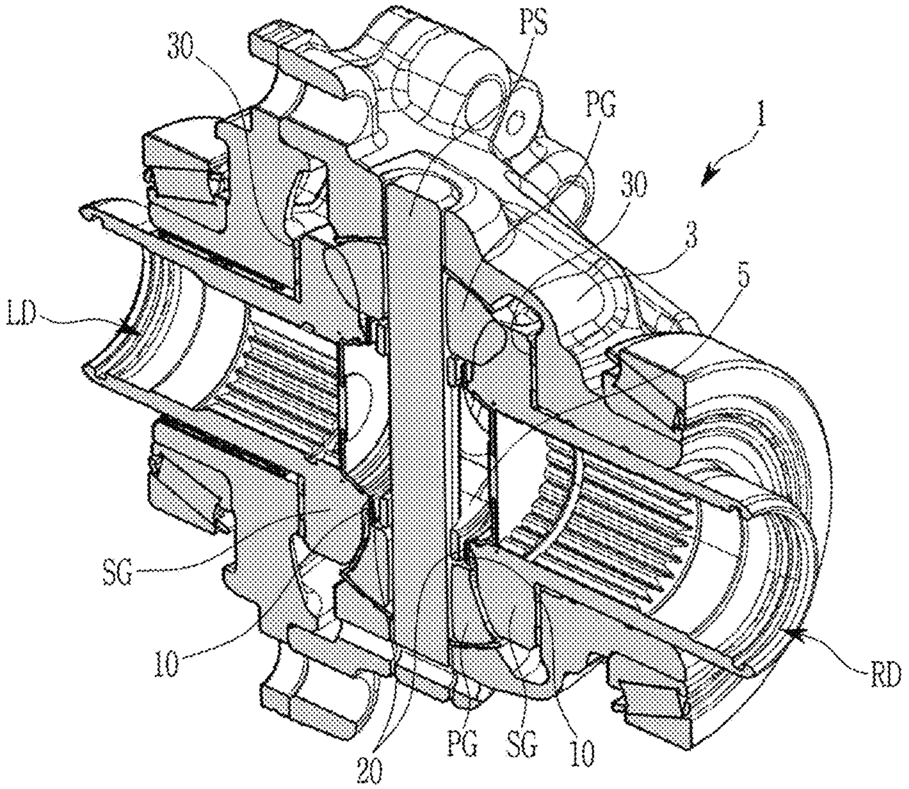
FIG. 1 is a cross-sectional perspective view of a differential apparatus for an electric vehicle according to various disclosure.

1: differential apparatus
3: differential case
5: pinion shaft supporter
PS: pinion shaft
PG: pinion gear
SG: side gear
10: support plate
11: support end
20: elastic member (wave a washer)
30: spacer
G: support groove The drawings referenced above are not necessarily to scale, but should be understood as presenting rather simplified representations of various exemplary features illustrating the basic principles of the present disclosure. For example, certain design features of the present disclosure, including particular dimensions, direction, position, and shape, will be determined in part by the particular intended application and usage environment.

DETAILED DESCRIPTION OF THE EMBODIMENTS

Hereinafter, referring to the drawings, embodiments included in the present specification are described in detail, and identical or similar components are provided the same or similar reference numerals and redundant descriptions thereof are omitted.

When describing embodiments included in the present specification, if it is determined that a detailed description of related known technology may obscure the gist of the exemplary embodiments included in the present specification, the detailed description is omitted. Furthermore, the appended drawings are only intended to facilitate easy understanding of the exemplary embodiments included in the present specification, and the technical ideas included in the present specification are not limited by the appended drawings, and should be understood to include all modifications, equivalents, or substitutes included in the spirit and technical scope of the present disclosure.

Terms that include ordinal numbers, such as first, second, etc., may be used to describe various configurations of elements, but the components are not limited by the terms. The terms are used solely to distinguish one component from another.

When a component is said to be "connected" or "combined" to another component, it should be understood that it may be directly connected or connected to that other component, but there may also be other components in between. On the other hand, when a component is said to be "directly connected" or "directly combined" to another component, it should be understood that there are no other components in between.

In the present application, it should be understood that terms such as "include" or "have" are intended to specify the presence of a feature, number, step, operation, component, part or combination thereof described in the specification, but do not exclude in advance the possibility of the presence or addition of one or more other features, numbers, steps, operations, components, parts or combinations thereof.

Terms such as "unit", "portion", "part", "module", and "means" described in the specification are assigned or used interchangeably only for the convenience of writing the specification, and do not have distinct meanings or roles in themselves. Terms such as "unit", "portion", "part", "module", and "means" described in the specification may mean a unit that processes at least one function or operation, and this may be implemented by hardware, software, or a combination of hardware and software.

As used herein, the singular forms are intended to include the plural forms as well, unless the context clearly indicates otherwise. As used herein, the term "and/or" includes any one or all combinations of the associated listed items.

Figure 2:
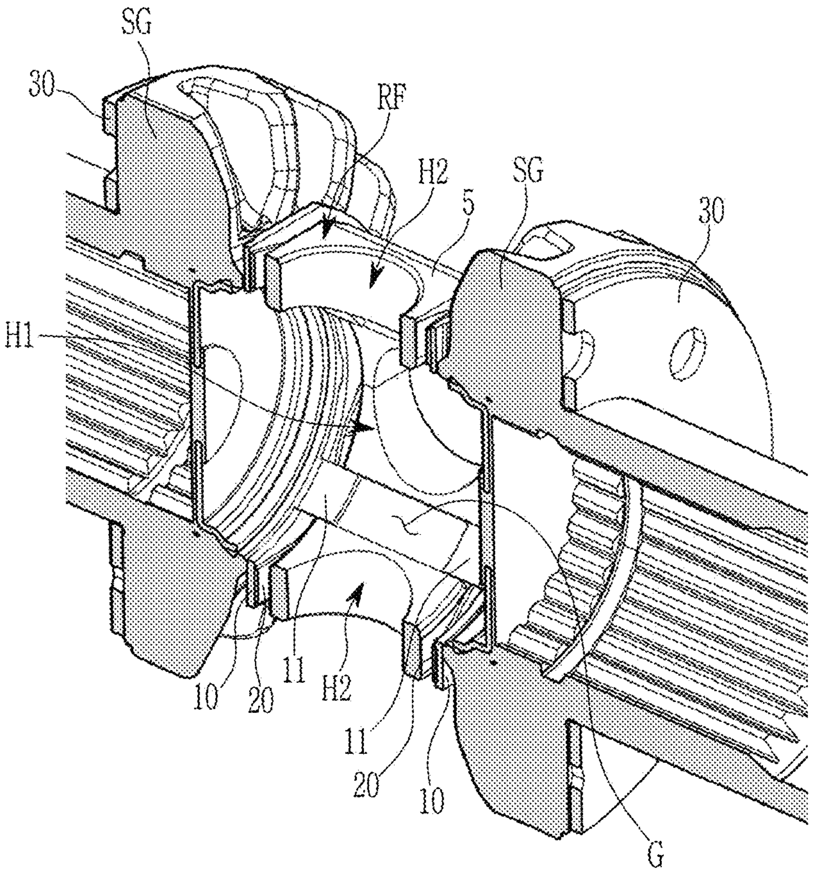
FIG. 2 is a cross-sectional perspective view of a differential apparatus for an electric vehicle according to various disclosure, with the pinion shaft removed.
Figure 3:
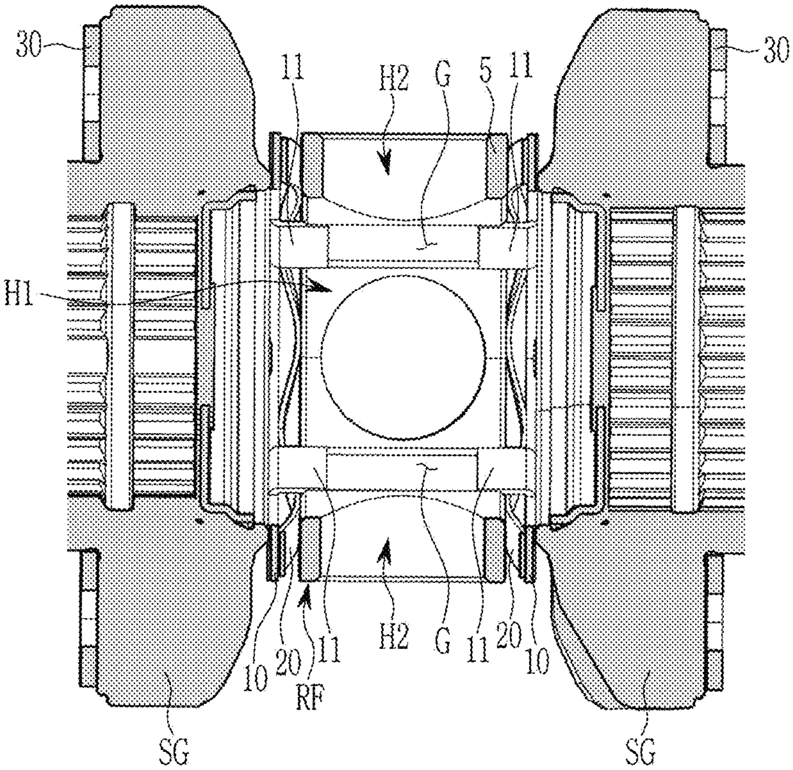
FIG. 3 is a partially enlarged cross-sectional view of FIG. 2.

FIG. 1 is a cross-sectional perspective view of a differential apparatus for an electric vehicle according to various disclosure, FIG. 2 is a cross-sectional perspective view of a differential apparatus for an electric vehicle according to various disclosure, with the pinion shaft removed, and FIG. 3 is a partially enlarged cross-sectional view of FIG. 2.

Referring to FIG. 1 and FIG. 2, a differential apparatus 1 for an electric vehicle according to various disclosure of the present disclosure includes an elastic member 20 disposed between a pinion shaft supporter 5 inside a differential case 3 and side gears SG on both sides to support the side gears SG on both sides from being pushed inward in the axial direction, maintaining initial backlash between the side gears SG on both sides and the pinion gears PG on both sides.

Referring to FIG. 1 to FIG. 3, the differential apparatus 1 for an electric vehicle according to various disclosure includes the differential case 3, a pinion shaft PS, the pinion shaft supporter 5, the pinion gears PG, the side gears SG, support plates on both sides 10, and elastic members 20.

The differential case 3 is disposed between the left and right driveshafts LD and RD LD and RD to form an external shape of the differential apparatus 1, and is configured to receive driving torque and rotate while accommodating the above components.

The pinion shaft PS is disposed in the differential case 3 at a right angle to the left and right driveshafts LD and RD inside the differential case 3.

The pinion gears PG are rotatably disposed on both sides of the pinion shaft PS inside the differential case 3 so that they can rotate.

The drawing shows that the pinion gears PG are provided in pairs, but this is not limited to this, and three or more may be provided. That is, at least two pinion gears PG may be provided. For the convenience of understanding, it will be described that the pinion gears PG are disposed in pairs.

The side gears SG are also disposed in a fixed manner on the left and right driveshafts LD and RD in an orthogonal direction to the pair of pinion gears PG inside the differential case 3, and externally engages with the pair of pinion gears PG.

Spacers 30 having a predetermined thickness is interposed between the differential case 3 and the side gear SG on both sides to maintain a gap between the differential case 3 and the side gear SG.

The spacer 30 may be implemented in various forms, but in various disclosure, it may be formed in a disk shape, and it may be advantageous to have a deformation amount in the thickness direction so that a curve is formed on the internal periphery and it operates elastically by an axial force according to the differential.

The pinion shaft supporter 5 is disposed on the pinion shaft PS between the pair of pinion gears PG inside the differential case 3.

Figure 4:
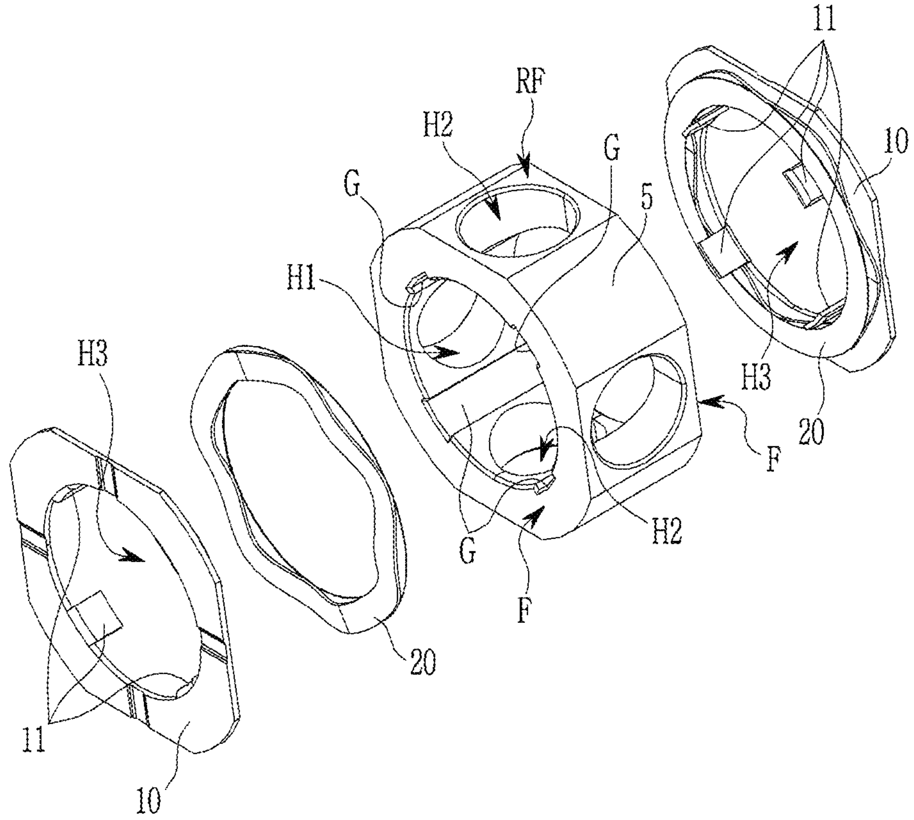
FIG. 4 is a perspective view of a pinion shaft supporter, an elastic member, and a support plate applied to a differential apparatus for an electric vehicle according to various disclosure.
Figure 5:
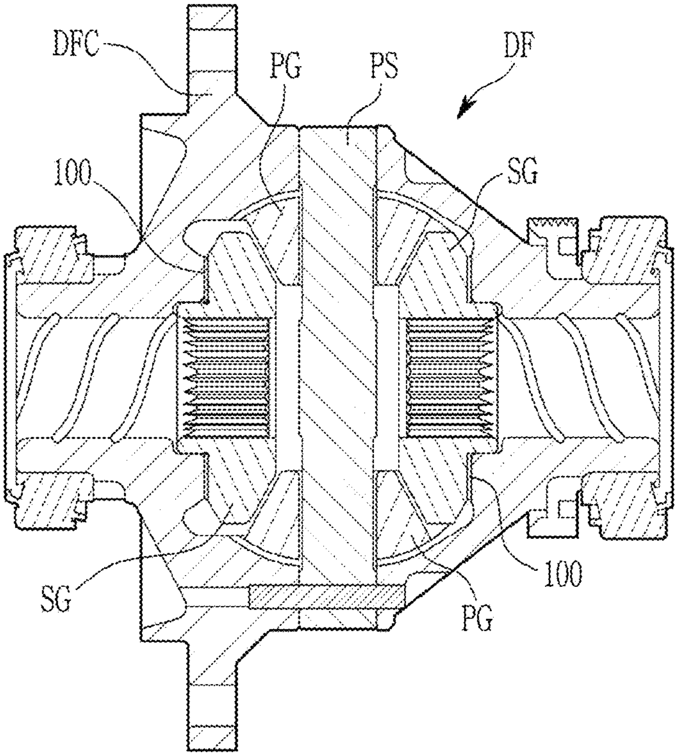
FIG. 5 Prior Art
FIG. 5 is a cross-sectional view of a typical vehicle differential apparatus.

FIG. 4 is a perspective view of a pinion shaft supporter, an elastic member, and a support plate applied to a differential apparatus for an electric vehicle according to various disclosure.

Referring to FIG. 4, the pinion shaft supporter 5 includes a penetration hole H1 formed in the axial direction to penetrate both lateral sides facing the pair of side gear SG, and both lateral sides of the penetration hole H1 circumference may be formed as a contacting surface F with which the elastic member 20 comes into contact.

Furthermore, two insertion holes H2 are formed in the pinion shaft supporter 5 to face each other on the circumferential surface RF, and the pinion shaft PS is inserted into the insertion holes H2. As illustrated in the drawing, a total of four insertion holes H2 may be formed in the circumferential surface RF, and each insertion hole H2 may be formed in two units to face each other, but is not limited thereto.

The support plates 10 on both sides are friction-supported by contacting with the respective internal surfaces of the pair of side gears SG, facing each other on both lateral sides of the pinion shaft supporter 5.

That is, the support plate 10 is formed with the same external shape as both lateral sides of the pinion shaft supporter 5, and may be made of a plate of wear-resistant material including a central hole H3 formed in the center portion which is the same as the penetration hole H1.

A support means may be formed on the support plate 10 to be supported on the penetration hole H1 internal circumference of the pinion shaft supporter 5 and to function as a fixed member in a rotation direction with respect to the pinion shaft supporter 5.

The support means may include a support groove G formed along the axial direction in the internal circumference of the penetration hole H1 of the pinion shaft supporter 5, and a support end portion 11 elongated in the axial direction from the internal diameter of the central hole H3 of the support plate 10 and supported by being fitted into the support groove G.

For example, as shown in the drawing, support grooves G and support end portions 11 may be formed in numbers of four each, but this is not limited thereto.

The support grooves G may be formed at a predetermined interval along the internal circumference of the penetration hole H1 of the pinion shaft supporter 5, and the support end portions 11 may be formed at a predetermined interval along the internal diameter of the center portion hole H3 of the support plate 10. For example, as shown in the drawing, the predetermined spacing may be, but is not limited to, 90 degrees.

The support groove G may be formed as a groove along the axial direction in the internal circumference of the penetration hole H1 of the pinion shaft supporter 5, and the support end portion 11 may be formed as a flange elongated along the axial direction from the internal diameter of the central hole H3 of the support plate 10. For example, as shown in the drawing, the support groove G and the support end portion 11 may be formed in a square shape, but are not limited thereto.

Referring to FIG. 4, the elastic members 20 are respectively disposed between both lateral sides of the pinion shaft supporter 5 and each internal side of the support plates 10 to provide an elastic force in the axial direction to each outward side of the pair of side gear SG.

In various disclosure, the elastic member 20 is shown as being applied as a wave washer, but it is not limited thereto; any member that provides elastic force between the pinion shaft supporter 5 and the support plate 10 may be applied.

According to various disclosure, the differential apparatus for an electric vehicle includes a backlash that increases or decreases due to an axial force in a direction according to the torque of a differential gear including the pinion gear PG and the side gear SG under actual vehicle driving conditions, or the backlash of the differential gear may increase or decrease due to various causes such as the angle of a driveshaft, the material of a boot, the position of a boot clamp, and temperature.

The side gear SG on both sides provides elastic force to prevent the side gear SG on both sides from being pushed inward by axial force by the wave washer, which is the elastic member 20 disposed between the pinion shaft supporter 5. The gap between the side gear SG on both sides and the differential case 3 may be maintained constant by a spacer 30 having a predetermined thickness.

That is, in the case of a 4 WD electric vehicle, when driving in 2 WD, the disconnector system on the auxiliary drive wheel side is released and a differential occurs due to high-speed rotation of the differential gear, so that the side gear SG is not pushed inward by the axial force of the driveshaft, etc., it provides an elastic force outward in the axial direction to maintain the backlash inside the differential gear constant. Accordingly, it prevents the occurrence of differential noise due to hard contact between the side gear SG and the pinion gear PG.

According to various disclosure, the differential apparatus for an electric vehicle includes the wave washer, which is the elastic member 20, placed between the pinion shaft supporter 5 inside the differential case 3 and the side gears SG on both sides. This prevents the side gear SG on both sides from being pushed inward in the axial direction even when axial force is generated due to the assemble tolerance of the driveshaft, the cut or driving torque of the driveshaft, or the axial direction pressure of the boot, and improves the generation of differential noise by maintaining the initial backlash of the differential gear.

Although the present disclosure has been described above with reference to exemplary embodiments thereof, it will be understood by those skilled in the art that various modifications and changes may be made to the present disclosure without departing from the spirit and scope of the present disclosure as set forth in the claims below.

What is claimed is:

1. A differential apparatus for an electric vehicle including a differential case disposed between left and right driveshafts, a pinion shaft disposed in the differential case in a direction perpendicular to the left and right driveshafts inside the differential case, at least two pinion gears rotatably coupled on each side of the pinion shaft, and a pair of side gears disposed in a direction perpendicular to the pinion gears and fixed on end portions of the left and right driveshafts respectively to engage the pinion gears, the differential apparatus comprising:

a pinion shaft supporter disposed on the pinion shaft between the pinion gears within the differential case;

support plates on first and second lateral sides of the pinion shaft supporter, which are friction-supported by contacting respective internal surfaces of the pair of side gears and facing the respective first and second lateral sides of the pinion shaft supporter; and elastic members respectively disposed between the first and second lateral sides of the pinion shaft supporter and the respective internal sides of the support plates to provide an elastic force in an axial direction of the pinion shaft supporter to the pair of side gears.

2. The differential apparatus of claim 1, wherein the pinion shaft supporter includes:

a penetration hole formed in the axial direction to penetrate the first and second lateral sides of the pinion shaft supporter facing the pair of side gears;

two insertion holes formed opposite to each other on a circumference surface of the pinion shaft supporter, into which a center portion of the pinion shaft is inserted; and contacting surfaces formed on the first and second lateral sides where the elastic members come into contact with the pinion shaft supporter.

3. The differential apparatus of claim 1, wherein the support plates are formed with the same external shape as the first and second lateral sides of the pinion shaft supporter and include a plate of wear-resistant material with a central hole formed in a center portion of the support plates identical to the penetration hole.

4. The differential apparatus of claim 3, wherein the support plates are formed with support means which are supported by an internal circumference of the pinion shaft supporter and fixed in a rotation direction with respect to the pinion shaft supporter.

5. The differential apparatus of claim 4, wherein the support means include:

a plurality of support grooves formed along the axial direction in the internal circumference of the pinion shaft supporter; and a plurality of support end portions elongated in the axial direction from an internal diameter of the central hole of the support plates and supported by being fitted into the plurality of support grooves.

6. The differential apparatus of claim 5, wherein the plurality of support grooves and the plurality of support end portions are formed at predetermined intervals along the internal circumference of the pinion shaft supporter and the internal diameter of the central hole of the support plates.

7. The differential apparatus of claim 5, wherein each of the plurality of support grooves is formed as a groove along the axial direction in the internal circumference of the pinion shaft supporter, and wherein each of the plurality of support end portions is formed as a flange extending along the axial direction from the internal diameter of the central hole of the support plates.

8. The differential apparatus of claim 1, wherein the elastic members include a wave a washer.

9. The differential apparatus of claim 1, further including spacers interposed between the differential case and the pair of side gears on first and second sides of the differential case.

* * * * *